No. 612,183. Patented Oct. 11, 1898.
F. H. ACKER.
COMBINED FLOUR BIN AND DOUGH RAISER.
(Application filed Feb. 14, 1898.)

(No Model.) 2 Sheets—Sheet 1.

Witnesses  Frederick H. Acker, Inventor
By his Attorneys,

No. 612,183. Patented Oct. 11, 1898.
F. H. ACKER.
COMBINED FLOUR BIN AND DOUGH RAISER.
(Application filed Feb. 14, 1898.)

(No Model.) 2 Sheets—Sheet 2.

Witnesses
John F. Deufferwil
U. B. Hillyard.

Frederick H. Acker, Inventor
By his Attorneys,
C. A. Snow & Co.

UNITED STATES PATENT OFFICE.

FREDERICK HORATIO ACKER, OF SOUTH HAVEN, MICHIGAN, ASSIGNOR OF ONE-HALF TO MALCOLM CAMERON MOTT, OF SAME PLACE.

COMBINED FLOUR-BIN AND DOUGH-RAISER.

SPECIFICATION forming part of Letters Patent No. 612,183, dated October 11, 1898.

Application filed February 14, 1898. Serial No. 670,261. (No model.)

*To all whom it may concern:*

Be it known that I, FREDERICK HORATIO ACKER, a citizen of the United States, residing at South Haven, in the county of Van Buren and State of Michigan, have invented a new and useful Combined Flour-Bin and Dough-Raiser, of which the following is a specification.

The object of this invention is to provide a device for raising bread preparatory to baking and for maturing flour and maintaining the same at a proper temperature for kneading when working the dough and shaping the same into loaves or other forms, according to the nature of the food being prepared. Combined with the receptacle are means for supporting pans at different levels, so as to secure a free circulation of air at the proper temperature, a box for holding a quantity of flour, whereby the dough and flour may be of the same temperature when combined, and an adjustable support for a lamp or like form of heater, whereby the temperature within the receptacle may be maintained at any desired degree.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
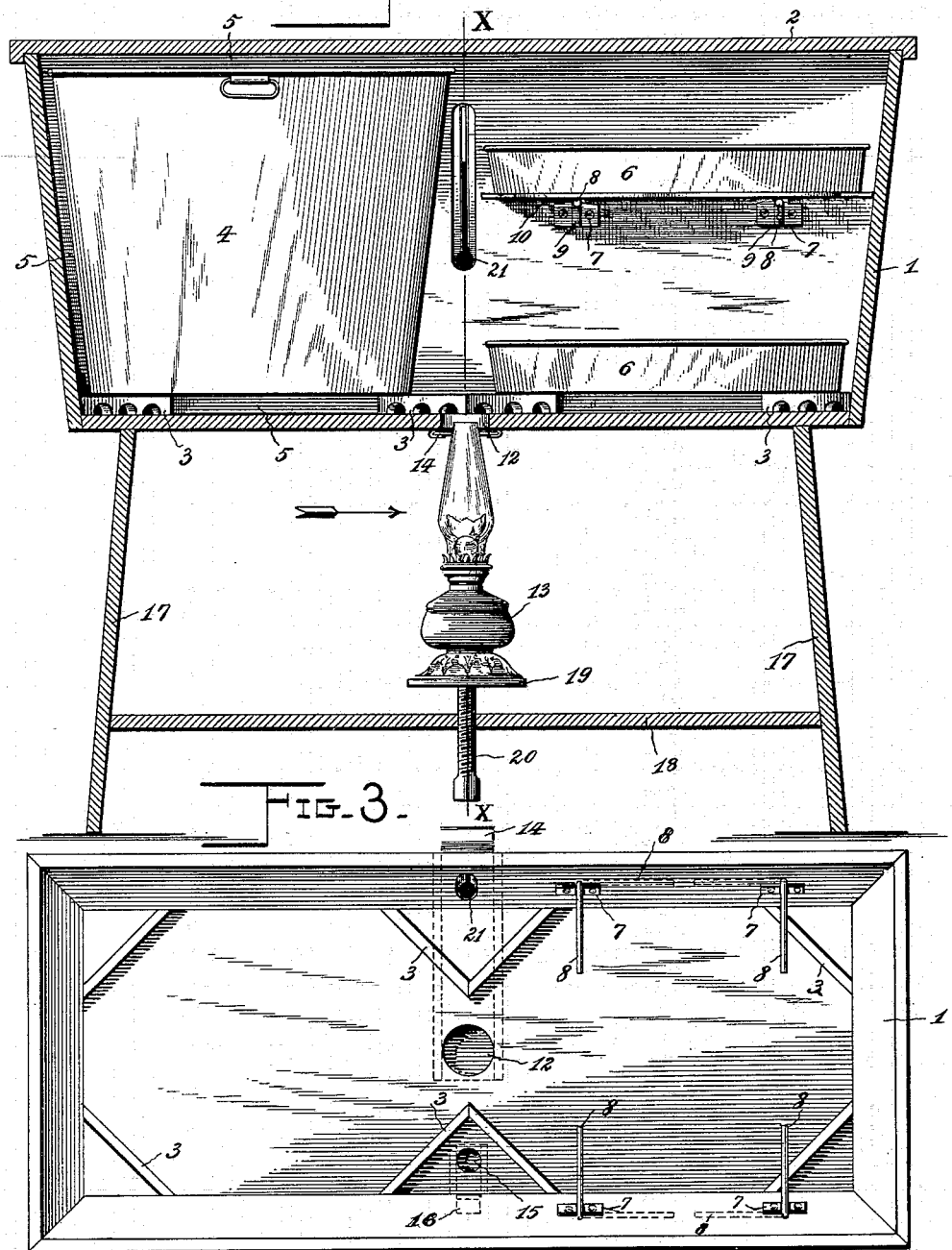
Figure 2:
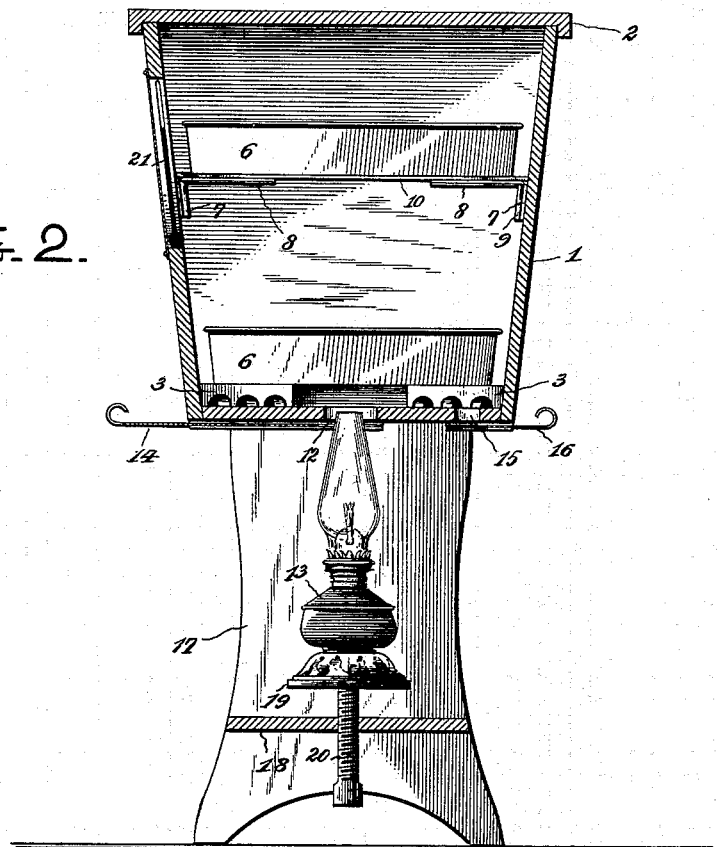
Figure 4:
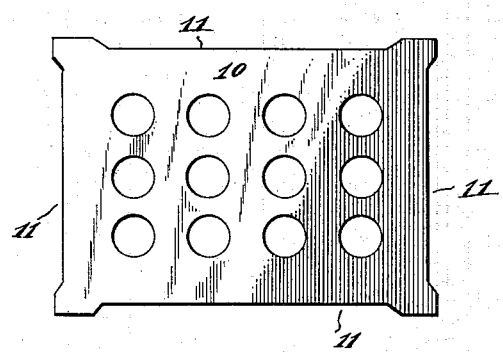

Figure 1 is a central longitudinal section of an apparatus constructed in accordance with this invention. Fig. 2 is a transverse section thereof about on the line $x\ x$ of Fig. 1, looking to the right, as indicated by the arrow. Fig. 3 is a top plan view, the cover, bread-pans, and flour-box being omitted. Fig. 4 is a plan view of a shelf.

Corresponding and like parts are referred to in the following description and indicated in all the views of the drawings by the same reference characters.

The receptacle 1 is of oblong form with sloping sides and is closed by a cover 2, which is made removable to admit of access to the interior of the receptacle for any desired purpose. This cover 2 also serves as a kneading-board, upon which the dough is worked when making the bread. Supports 3 are applied to the bottom of the receptacle to hold the vessels placed therein at a distance above the bottom of the receptacle, so as not to obstruct the circulation of hot air. These supports are notched or cut away at intervals in their lower edges, so as to provide passages for the circulation of the air when the various vessels are placed upon the supports. The supports located at the four corners of the receptacle are diagonally arranged, and those placed at an intermediate point incline in opposite directions, forming triangles with the sides of the receptacle, as clearly indicated in the plan view. A box 4 for containing a quantity of flour is located within the receptacle, at one end thereof, and is placed upon the supports 3 at one end of the apparatus and is of such dimensions as to leave a space 5 between its top, side, bottom, and ends and corresponding parts of the receptacle 1 to admit of the warm air coming into contact with all parts of the said box. A pan 6 is placed upon the supports at the opposite end of the receptacle 1 and is of a size to have a space surrounding it at all sides.

Keepers 7 are secured to opposite sides of the receptacle 1 in the same horizontal plane and pivotally support bracket-arms 8, which have their inner ends bent at right angles and fitted into the bearing or sleeve portions of the keepers 7. The keepers 7 are plates or pieces of sheet metal having their middle portions bent to one side, so as to form sleeves 9, in which the vertical ends of the bracket-arms 8 are journaled. The upper ends of the sleeves 9 are cut away, so that when the bracket-arms are swung outwardly they will drop into the cut-away portions of the sleeves and be held in position for supporting a pan 6 or shelf 10 without liability of displacement. These bracket-arms when not required for active service can be turned or folded against the sides of the receptacle 1, so as to be out of the way. The shelf 10 is a perforate plate and has its edge portions cut away, as shown at 11, to provide spaces for the circulation of the hot air.

An opening 12 is formed centrally in the bottom of the receptacle 1 and provides for the admission of hot air, which in the present instance is supplied by means of a lamp or like heater 13. A slide 14 is adapted to close the opening 12, so as to shut off the supply of hot air more or less or entirely close the said opening when required. An opening 15 is located near one side of the receptacle and is formed in the bottom thereof and admits cold air into the receptacle for tempering the hot air and moderating the temperature within the receptacle when too warm. A cut-off 16 is provided for controlling the opening 15 in a manner similar to the cut-off 14.

The receptacle is elevated, so as to admit of the heater 13 being placed thereunder, and is mounted upon a stand composed of end pieces 17 and a connecting-shelf 18, the upper ends of the part 17 having parts projecting through openings in the bottom of the receptacle 1, so as to prevent lateral displacement of the receptacle and stand when fitted together. A rest 19 has adjustable connection with the shelf 18 by means of a threaded stem or screw 20, let into a threaded opening of the said shelf. The lamp or heater 13 is placed upon the rest 19 and can be raised or lowered by a proper adjustment of the screw or threaded stem 20. The upper end of the lamp-shade passes within the opening 12, thereby directing the hot air into the receptacle 1. The temperature is determined by means of a thermometer 21, which is located within the receptacle and is under observation through a vertical slot in a side of the receptacle, and which slot is protected by mica, glass, or other transparent substance.

The receptacle is sufficiently tight to prevent the escape of the warm air and can be pressed into service for a variety of uses when not in service for maturing flour and raising bread or dough. By having the box 4 and the pans 6 or like vessels located so as to provide surrounding spaces the hot air can circulate and preserve an even temperature throughout the interior of the receptacle, thereby securing the desired ends for which the invention is designed.

Having thus described the invention, what is claimed as new, and desired to be secured by Letters Patent, is—

1. An apparatus of the class described comprising a receptacle having independent air-openings, the supports 3 mounted upon the bottom of the receptacle and disposed diagonally across the corners and arranged at opposite sides of the receptacle and forming triangles with the same, said supports 3 being cut away at their lower edges to provide passages for the circulation of air, and vessels arranged upon the supports, substantially as described.

2. In apparatus of the character set forth, the combination of an oblong-shaped receptacle provided intermediate of its ends with damper-controlled openings for the admission of hot and cold air, middle and end supports placed upon the bottom of the receptacle and cut away at their lower edges to provide air-circulating passages, a box located within an end portion of the receptacle and resting upon the contiguous end supports and an end portion of the middle supports, and of slightly less dimensions than the interior of the end portion of the receptacle to provide a communicating space at the bottom, sides, ends, and top of the box for the free circulation of air, and vessels placed in the other end portion of the receptacle at different elevations and having a surrounding air-circulating space, the lower vessel resting upon the opposite end portion of the said middle supports and upon the adjacent end supports, substantially as set forth.

3. In a bread-raising apparatus, the combination with the receptacle for receiving the pans containing the bread and adapted to have hot air supplied thereto, of keepers secured to the sides of the receptacle and formed with vertical bearing-sleeves cut away at their upper ends, and bracket-supports journaled in the bearing-sleeves of the keepers and adapted to be folded against the sides of the receptacle and to be turned outwardly, and held in operative position by entering the cut-away portions of the bearing-sleeve, substantially as set forth.

In testimony that I claim the foregoing as my own I have hereto affixed my signature in the presence of two witnesses.

FREDERICK HORATIO ACKER.

Witnesses:
MACK SMITH,
CHARLES KISER.